United States Patent
Rosenberg

(10) Patent No.: US 9,940,649 B2
(45) Date of Patent: Apr. 10, 2018

(54) SYSTEM AND METHOD FOR INTEGRATING RETAIL PRICE OPTIMIZATION FOR REVENUE AND PROFIT WITH BUSINESS RULES

(71) Applicant: Clear Demand, Inc., Scottsdale, AZ (US)

(72) Inventor: Adam N. Rosenberg, Scottsdale, AZ (US)

(73) Assignee: Clear Demand, Inc., Scottsdale, AZ (US)

(*) Notice: Subject to any disclaimer, the term of this patent is extended or adjusted under 35 U.S.C. 154(b) by 965 days.

(21) Appl. No.: 14/051,393

(22) Filed: Oct. 10, 2013

(65) Prior Publication Data
US 2014/0129294 A1    May 8, 2014

Related U.S. Application Data

(60) Provisional application No. 61/795,074, filed on Oct. 10, 2012.

(51) Int. Cl.
*G06Q 30/02* (2012.01)

(52) U.S. Cl.
CPC ................. *G06Q 30/0283* (2013.01)

(58) Field of Classification Search
CPC ........................... G06Q 30/0283
USPC .......................... 235/378; 705/400
See application file for complete search history.

(56) References Cited

U.S. PATENT DOCUMENTS

2008/0208719 A1* 8/2008 Sharma ............. G06Q 10/0875
705/29
2012/0130726 A1* 5/2012 Subramanian .......... G06F 17/11
705/1.1

* cited by examiner

*Primary Examiner* — Toan Ly
(74) *Attorney, Agent, or Firm* — Polsinelli PC

(57) ABSTRACT

The disclosed technology improves the process of generating recommended prices for retail products by optimizing revenue and profit while complying with a set of business rules by assigning a monetary value to each business rule. Then for each decision price that violates a business rule constraint, a penalty value is added to the monetary value. If the monetary value including the penalty is better than an original monetary value, the decision price is included in the recommended prices.

15 Claims, 12 Drawing Sheets

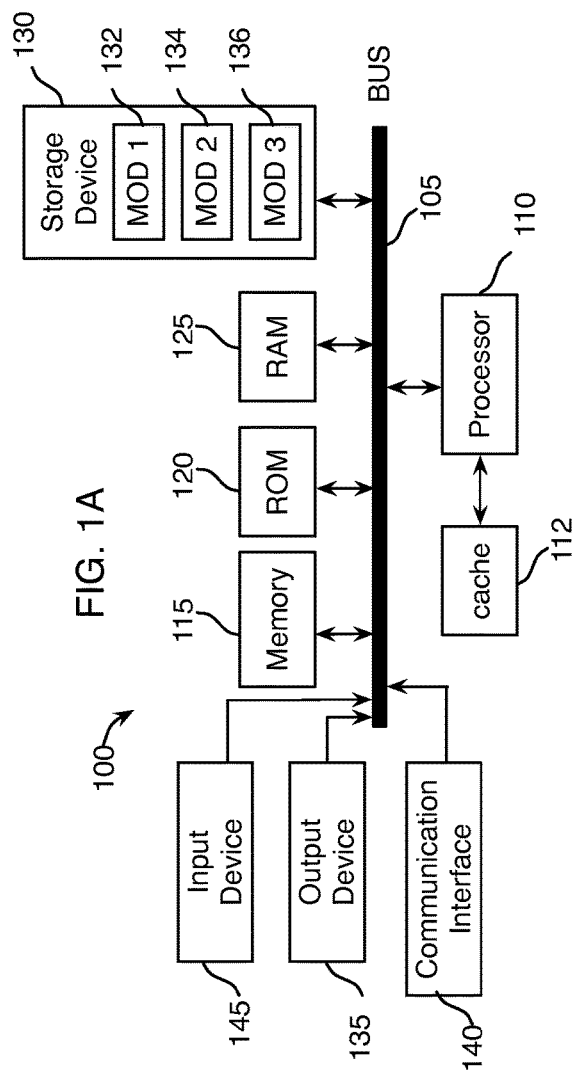
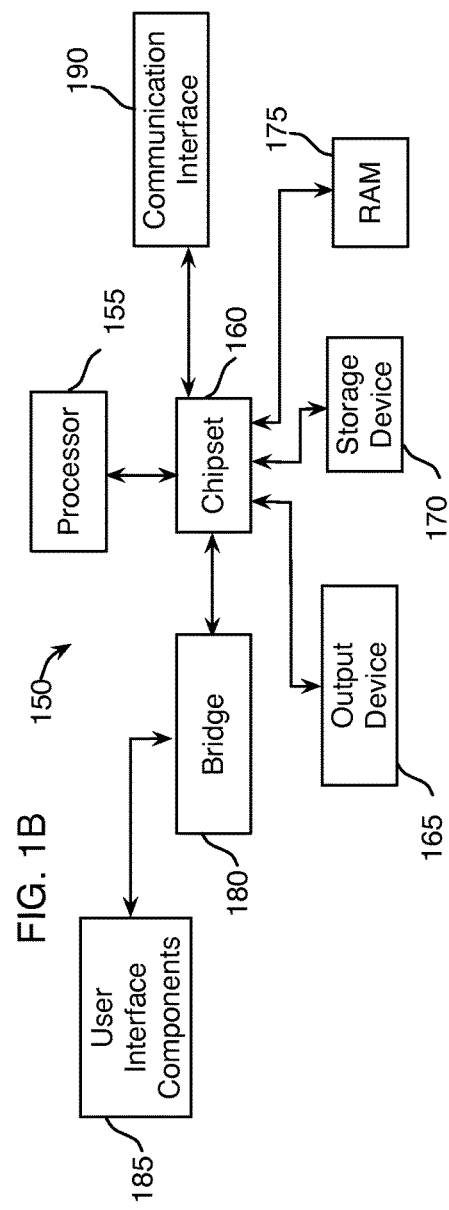
FIG. 1A
FIG. 1B

SYSTEM AND METHOD FOR INTEGRATING RETAIL PRICE OPTIMIZATION FOR REVENUE AND PROFIT WITH BUSINESS RULES

CROSS REFERENCE TO RELATED APPLICATIONS

This application claims the benefit of U.S. Provisional Patent Application No. 61/795,074, entitled "SYSTEM AND METHOD FOR INTEGRATING RETAIL PRICE OPTIMIZATION FOR REVENUE AND PROFIT WITH BUSINESS RULES", filed on Oct. 10, 2012, and which is hereby expressly incorporated herein by reference in its entirety.

FIELD OF INVENTION

The present disclosure relates to generating recommended prices, and more specifically pertains to recommended prices that effectively trade off revenue-profit values and retail-price business rules.

BACKGROUND

There has been a steady evolution in retail science towards solutions with more sensitivity to business reality. Early mathematical solutions in price optimization made retailers more revenue and profit but often generated solutions that were in conflict with business rules. For example, in most retail settings the double-size box should be more than the single-size box, but not quite twice as much. Newer price optimization techniques involve performing business-rule compliance as a post-process procedure, treating business rules as absolute constraints and resolving unavoidable conflict with rule prioritization, or leaving business-rule compliance as a user task. These techniques can produce calculations that are difficult and often not followed and can lead to sub-optimal recommended prices.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for a price optimization technique that can be used in generating recommended prices for retail products. Using a demand model, prices can be optimized within product networks based on a tradeoff of revenue, profit, and one or more business constraints. The result is a set of recommended prices in which one or more products can be assigned a price different than an original price of the product. In theory, such an approach produces an ideal set of prices that maximize revenue and/or profit. However, the set of recommended prices may be unworkable in a realistic business setting.

One problem that storeowners can face is that the generated recommended prices can violate one or more business rules. The business rules can govern a single price, such as minimum or maximum price change, margin, locked prices, competitive prices, ending numbers, and multiples. The business rules can also define relationships between different products thus involving two decision prices, such as size, brand, product line, and promotion. Determining recommended prices becomes more difficult with each business rule that needs to be followed. For example, price relationships between different sizes of the same product and different, interchangeable brands can make it difficult to optimize revenue and profit. The presently disclosed price optimization technique addresses this limitation by assigning a reasonable monetary value to each rule and resolving the combination of revenue, profit, and rule compliance. That is, the price optimization technique can generate recommended price sets that optimize revenue and profit while complying with a set of business rules by assigning a monetary value to each business rule.

The disclosed price optimization technique can be applied to networks of rule-related product prices. In general, the present price optimization technique generates a set of recommended prices for a collection of product networks by first obtaining constraint determined networks, or product networks. The technique then generates a collection of price-optimized solution sets for a product network by optimizing a decision price set for the product network based on one or more revenue-profit weights. The technique optimizes the decision price set by repeatedly selecting a revenue-profit weight. For each selected revenue-profit weight, the technique generates a constrained best solution set and an unconstrained best solution set. The technique generates the constrained best solution set based on a first set of business rules that include at least one flexible or optional business rules, e.g., maximum price change, margin, competitive pricing, size, brand, product line, and promotion; and the unconstrained best solution set based on a second set of business rules. Both the first and second set of business rules can include non-negotiable or hard business rules, e.g., minimum price change, locked process, ending numbers, and multiples. The constrained best solution is the recommend price set for a selected weight and the unconstrained best solution is the optimal price set for the selected weight.

The technique generates a best solution set, either constrained or unconstrained, by calculating a current monetary value based on an obtained current price set. For example, for a revenue-profit weight, monetary value can be defined as Value=$((1-W) \times \text{Revenue}) + (W \times \text{Profit}))$. The technique also obtains initially optimized prices for the selected revenue-profit weight and calculates an initially optimized monetary value based on the initially optimized prices. The technique obtains both a current monetary value and an initially optimized monetary value to identify which is better. Once the technique has both the current monetary value and the initially optimized monetary value, the technique checks if the initially optimized monetary value is less than the current monetary value. If so, the technique sets the current prices as the initial decision prices for the product network. Otherwise, the technique sets the initially optimized prices as the initial decision prices for the product network. Then the technique repeatedly updates a price change fraction while the price change fraction is greater than a predefined minimum value. For each price change fraction, the technique computes a best-so-far price set. Once the price-change fraction has reached the minimum, the best-so-far price set becomes the best solution set.

To compute the best-so-far price set, the technique first computes an initial monetary value and a value-plus-constraints value for the initial decision set. The value-plusconstraints value is designed to assign a monetary value to the combination of revenue, profit, and rule compliance by answering the question: How many dollars of revenue-profit value is a violation of a flexible business rule worth? In particular, the value-plus-constraints value is computed for a set of decision prices by starting with the optimal revenue-profit monetary value for the decision set. That is, the maximum revenue-profit value without regard for any business rules. Then for each decision price that violates a business rule constraint, a penalty value is added to the value. After computing the initial monetary value and value-plus-constraints value, the technique repeatedly selects a decision price from the decision prices. From the selected decision price, the technique computes both a positive changed price and a negative changed price to compute an updated monetary value and an updated value-plus-constrains value. From this the technique can determine whether to include the positive changed price or the negative changed price in the decision price set.

The penalty value, in general can be computed based on a penalty function, such as $p(\epsilon/P^{opt})$, where a constraint violation $\epsilon$ is scaled down by the optimal price $P^{opt}$. The result of the penalty function is then scaled by the optimal revenue-profit value yielding a constraint penalty value of $V^{opt} \times p(\epsilon/P^{opt})$.

Once the price optimized solution sets are identified, the technique can output information about the price optimized solution sets. In some cases, the output can be a point on a revenue-profit frontier curve.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 1A and 1B illustrate exemplary system embodiments;

DETAILED DESCRIPTION

Figure 2:
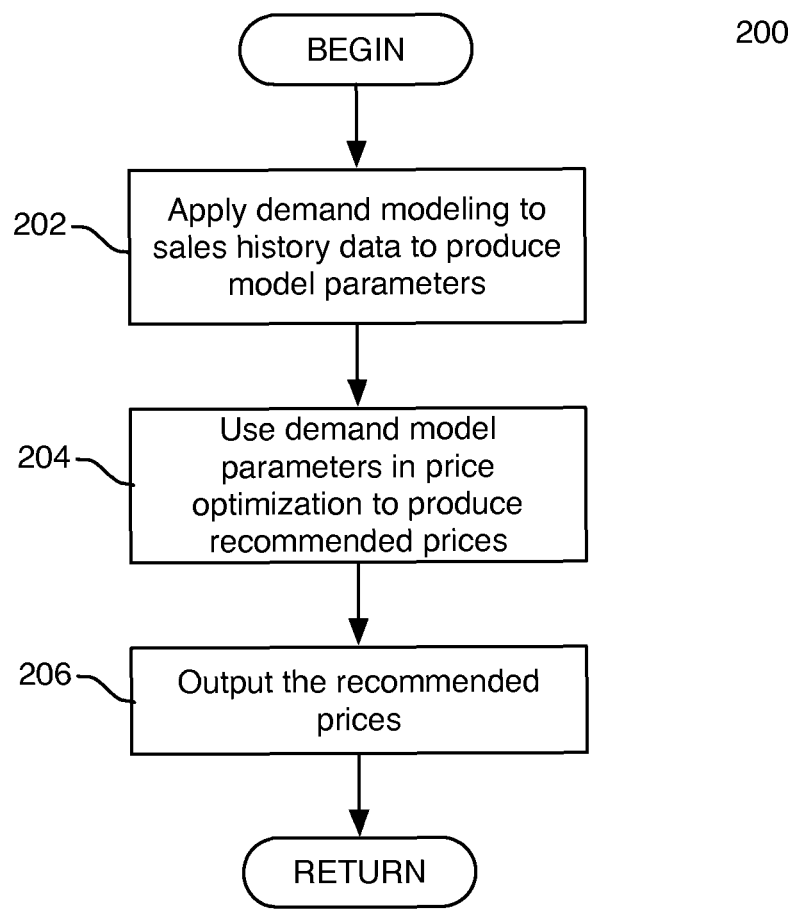
FIG. 2 illustrates an exemplary method embodiment for retail price optimization.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for an improved technique of generating recommended prices for retail products. Using the present technology it is possible to generate recommended prices for a group of products that optimize revenue and profit while respecting business rules. The disclosure first sets forth a discussion of a basic general purpose system or computing device in FIGS. 1A and 1B that can be employed to practice the concepts disclosed herein before turning to a discussion of relevant terms and a more detailed description of the improved technique for generating recommended prices.

FIG. 1A and FIG. 1B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 1A illustrates a conventional system bus computing system architecture 100 wherein the components of the system are in electrical communication with each other using a bus 105. Exemplary system 100 includes a processing unit (CPU or processor) 110 and a system bus 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

FIG. 1B illustrates a computer system 150 having a chipset architecture that can be used in executing the described method and generating and displaying a graphical user interface (GUI). Computer system 150 is an example of computer hardware, software, and firmware that can be used to implement the disclosed technology. System 150 can include a processor 155, representative of any number of physically and/or logically distinct resources capable of executing software, firmware, and hardware configured to perform identified computations. Processor 155 can communicate with a chipset 160 that can control input to and output from processor 155. In this example, chipset 160 outputs information to output 165, such as a display, and can read and write information to storage device 170, which can include magnetic media, and solid state media, for example. Chipset 160 can also read data from and write data to RAM 175. A bridge 180 for interfacing with a variety of user interface components 185 can be provided for interfacing with chipset 160. Such user interface components 185 can include a keyboard, a microphone, touch detection and processing circuitry, a pointing device, such as a mouse, and so on. In general, inputs to system 150 can come from any of a variety of sources, machine generated and/or human generated.

Chipset 160 can also interface with one or more communication interfaces 190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 155 analyzing data stored in storage 170 or 175. Further, the machine can receive inputs from a user via user interface components 185 and execute appropriate functions, such as browsing functions by interpreting these inputs using processor 155.

It can be appreciated that exemplary systems 100 and 150 can have more than one processor 110 or be part of a group or cluster of computing devices networked together to provide greater processing capability.

Having disclosed some components of a computing system, the disclosure now turns to a brief description of terms relevant to retail science.

Product Grouping: distinct products are items on retail shelves or online perceived as different by shoppers. The products can be grouped into different types of groupings. The process of identifying price families and product networks is called product linking.

Price Families: products can be grouped into price families. Each price family can have products that share similar shopper response to price change and require identical prices. For example, six-ounce (6 oz.) containers of Dannon™ Yogurt in various flavors, such as, plain, vanilla, strawberry and strawberry-banana, would be in one price family since they share similar shopper demand and are priced the same.

Product Networks: price families can be grouped into product networks. Each product network can have price families that are linked together by at least one comparative business rule. For, example, Coke™ products of different sizes, Pepsi™ products of different sizes, and store-brand soda products of different sizes can be linked together by one or more comparative rules. For example, a twelve-ounce (12 oz.) can of Coke™ and a twelve-ounce (12 oz.) can of Pepsi™ may be the same price and each may be twenty percent (20%) more expensive than a twelve-ounce (12 oz.) can of the store brand cola soda. Similarly, a sixteen-ounce (16 oz.) container of Coke™ may be ten percent (10%) more expensive than a twelve-ounce (12 oz.) can of Coke™. In another example, a sixteen-ounce (16 oz.) container of Pepsi™ may be thirty percent (30%) more expensive than a twelve ounce (12 oz.) of the store brand cola soda.

Store Grouping: stores are different places to shop. An online retail environment can be considered to be one store. The process of identifying markets, zones, locations, and areas is called store linking. Markets can be a collection of stores with common shoppers, typically defined geographically, but can be defined demographically. Zones can be collections of markets defined by retailers for one or more reasons. Locations can be collections of one or more stores defined by the granularity of available sales data. Areas can be collections of one or more locations defined by the granularity of price decisions. While retail-science can have areas as disjoint collections of locations, an area for a product can be different for two different promotions. For example, a first soda retailer can have city-by-city pricing for their sodas and a second soda retailer can have statewide pricing.

Customer Types: communities of shoppers identified in a pricing environment. For example, a product might be offered at a discount for a group of people, such as club members, people over a specific age and students.

Sales Types: can be different types of selling promotions which can include no promotions, signage, products at the end of an aisle ("endcaps"), discount and buy some, get some free.

Decision Prices: individual price decisions can be based on price family, area, customer type and sales type.

Decision Price Sets: decision prices can be grouped into decision price sets based on one or more comparative business rules, such as size or brand.

Bounded Business Rules: can be ranges imposed on individual decision prices. Examples can include competitive prices (price of a product based on competitor's price), margin requirements (no less than cost plus a set percentage of the price), price-change amounts (no change more than a set percentage or amount or no change less than a set percentage or amount) and locked decision price (price cannot change from its current price). Retailers can also have bounded business rules with lower bounds based on competition and upper bounds based on margin.

Comparative Business Rules: can be relationships between two decision prices. For example, a size rule where the price for one product having a first size can have a fixed rate higher than the same product having a second size, such as a twenty ounce (20 oz.) bag of chips can cost 1.6 times higher than a ten ounce (10 oz.) bag of chips). In another example, a brand rule where one brand of a product can have a fixed rate higher than a second brand of the same product, such as the price for a national brand soda can be 1.3 times higher than a store brand soda can. Decision prices can be bounded by two comparative business rules, such as brand and size.

Maximum Price Change: price changes for a product can only be changed by a certain percentage or amount from the current price, such as the manufactured recommended price.

Minimum Price Change: price changes for a product can only be changed by a certain percentage or amount from the current price, such as the manufactured recommended price.

Margin: the price for a product required to earn a minimum margin. Margin can be profit divided by revenue or price minus cost divided by price.

Locked Prices: a price that cannot be changed.

Competitive Pricing: a price of a same or similar product offered by another retailer can be a factor in setting a price for the product. For example, a retailer may require a price of a product be lower than a same product sold by a competing retailer. In another example, a retailer may require a price of a product be within a percentage of the price offered by a competing retailer, e.g. five percent lower so that the price is lower, but not too low.

Size: two products that are the same, but different sizes, can have a price relationship. Typically, the larger sized product is more expensive than the smaller sized product, but is less expensive on a unit basis. For example, a twenty ounce (20 oz.) container for a first product would have a fixed price relationship with a ten ounce (10 oz.) container for the first product, such as 1.5 or 1.8 times more expensive.

Brand: two products that are similar but different brands can have a price relationship. Typically, one brand is considered superior to the other and there is a range of price ratios based on shopper perception. For example, a brand name cereal would be between 1.3 and 1.6 times as expensive as the store-brand version. When different brand products are different sizes, the constraint can be considered a brand constraint and the ratios combine in the least-restrictive way. For example, a twenty ounce (20 oz.) box a name brand cereal should be between (1.3×1.5) and (1.8×1.6) as expensive as a ten ounce (10 oz.) box of the store-brand version.

Product Line: two products that are the same brand, but different in another way, can have a price relationship. Typically, the same company or brand can offer different products under the same name/brand with a fixed price relationship. For example, a dairy company can offer a twenty ounce (20 oz.) container of ice cream to have a fixed price relationship with a twenty ounce (20 oz.) container of frozen yogurt, such as 1.2 or 1.3 times more expensive.

Cannibalization (Substitution): occurs when the sales of a first product detract from the sales of a second product. For example, when Coke™ goes on sale, its increased sales decrease the sales of Pepsi™.

Affinity (Halo Affect): occurs when the sales of one product enhance the sales of another product. For example, when the sales of hot dogs lead to increased sales of buns, relish, charcoal, etc.

Promotion: products on sale, or offered to specific customer groups, must be offered at a lower price compared to the recommended price. For example, the lower price can be for ten percent (10%) off or buy one get one free (BOGO).

Ending Numbers: product prices can be required to end in appropriate values. Typically, prices end with a nine (9) as the last digit in the price, such as "79" or "99." In one or more cases, the last two digits of the price can indicate the status of the product. For example, a product that ends in "99" can be for products that are always sold by the store, a product that ends in "89" can be for products that are seasonal, and a product that ends in "79" can be for products that will no longer be carried once they are sold out.

Multiples: products that come in multiples can have different pricing rules than single-item prices that end with a "9" for the last digit for the price. For example, when multiples of a product are offered, the price can end with two zeros ("00"), such as three (3) for three dollars ($3.00) or five (5) for five dollars ($5.00).

Number of Price Changes: a global rule for an assignment of decision prices may involve a limit on the number or percentage of prices that can change. For example, no more than twenty percent (20%) of the prices can change from current to recommended prices.

Global Margin: a global rule for the entire collection of decision prices can be expected global margin, which is that total profit (price minus cost) divided by total price should be above a specified value.

Revenue-Profit Weight: defines a business preference for profit over revenue. A value of zero for the revenue-profit weight means a retailer is aiming for maximum revenue in price assignment. A value of one for the revenue-profit weight means a retailer is aiming for maximum profit in price assignment. A value w between the zero and one means a retailer is aiming to maximize $(1-w)R+wP$, where R is revenue and P is profit.

Sales History Data: each entry in the sales history can specify a product or price family, a location, a customer type, a sales type, a time period, and/or numerical data such as price, costs, and/or units sold. Time periods can typically be in weeks with date ranges. Due to the nature of point of sales (POS) systems, the sales history typically does not contain zero sales information. It only contains data when a positive quantity is sold. Sales history can be for one or more groupings of products, all products offered for sale, or a subset of the products offered for sale. Sales history can cover one or more locations, all locations, or a subset of locations selling the products. Time periods can be coincident, overlapping, or non-overlapping for different groupings of products and locations.

Having defined a glossary of relevant terms, the disclosure now turns to a brief introductory description of using retail price optimization to generate recommended prices for retail products. In retail price optimization, a system can use demand modeling to analyze sales history data to generate a demand model, or demand-model parameters, of consumer demand for products. The system can then use the model to compute prices that maximize revenue, profit, or a combination of revenue and profit.

FIG. 2 is a flowchart illustrating an exemplary retail price optimization method 200. For the sake of clarity, this method is discussed in terms of an exemplary computing system, such as is shown in FIGS. 1A and 1B. Although specific steps are shown in FIG. 2, in other embodiments a method can have more or less steps than shown.

The retail price optimization begins when the computing system applies demand modeling to sales history data to produce model parameters (202), which can be used in a variety of retail-science analyses, including forecasting sales, price optimization, markdown, assortment planning, inventory replenishment, promotion planning, etc. In some embodiments, the predictions can be by product, store, time, and promotion status. The sales data can specify a variety of information about one or more products over a sequence of time periods. For example, the sales data can specify the number of sales per week over a two year time period.

The demand model can be a publically known demand model or a proprietary demand model. The model parameters can include economic demand elasticity and baseline sales. The model parameters can also include factors for seasonality and/or for specific local, such as regional and national events and holidays. In one or more embodiments, one or more demand models can have specific multipliers to account for promotional or sales events. The sales data can be for a common duration, such as two months or two years.

After applying demand modeling to sales data to produce demand-model parameters (or a demand model), the computing system can use the demand-model parameters in price optimization to produce recommended prices (204). The recommended prices can be for the decision prices corresponding to the sales history data. In some embodiments, the price optimization can be applied based on the model parameters and other inputs. The other inputs can include one or more of current prices, bounded business rules, and/or comparative business rules. The recommended prices can be a single list of prices or list of prices for one or more revenue-profit weights. As a result, the recommended prices can indicate revenue-profit goals, ending-number price compliance, common prices for price families, compliance with bounded business rules, compliance with comparative business rules, global margin requirements, and/or price-change requirements. In one or more embodiments, the computing system can forecast unit sales from current prices and recommended prices using the demand-model parameters. The computing system can also use the demand-model parameters for markdown analysis, assortment planning, inventory replenishment, promotion planning, etc.

After using the model parameters and other inputs in price optimization to produce recommended prices, the computing system can output the recommended prices (206). In some embodiments, the computing system can output the forecast unit sales from current prices and recommended prices. The output can be in one or more forms, including, but not limited to, rendering the recommended prices on a display, printed, and stored in one or more databases communicatively coupled to the processor. The recommended prices can be one set of decision-price recommendations or represent several revenue-profit weights.

As described above, price optimization is a key step in the process of generating recommended prices. Using a demand model, prices can be optimized within each product network to maximize revenue, profit, or a combination of revenue and profit. The result is a set of recommended prices in which one or more products can be assigned a price different than an original price of the product. In theory, such an approach produces an ideal set of prices that maximize revenue and/or profit. However, the set of recommended prices may be unworkable in a realistic business setting.

One problem that storeowners can face is that the generated recommended prices can violate one or more business rules. The business rules can govern a single price, such as minimum or maximum price change, margin, locked prices, competitive prices, ending numbers, and multiples. The business rules can also define relationships between different products thus involving two or more decision prices, such as size, brand, product line, and promotion. Determining recommended prices becomes more difficult with each business rule that needs to be followed. For example, price relationships between different sizes of the same product and different, interchangeable brands can make it difficult to optimize revenue and profit. The presently disclosed price optimization technique addresses this limitation by assigning a reasonable monetary value to each rule and resolving the combination of revenue, profit, and rule compliance. That is, the price optimization technique can generate recommended price sets that optimize revenue and profit while complying with a set of business rules by assigning a monetary value to each business rule.

The price optimization technique can be applied to networks of rule-related product prices. In general, the present price optimization technique generates a set of recommended prices for a collection of product networks by first obtaining constraint determined networks, or product networks. The technique then generates a collection of price-optimized solution sets for a product network by optimizing a decision price set for the product network based on one or more revenue-profit weights. The technique optimizes the decision price set by repeatedly selecting a revenue-profit weight. For each selected revenue-profit weight, the technique generates a constrained best solution set and an unconstrained best solution set. The technique generates the constrained best solution set based on a first set of business rules that include at least one flexible or optional business rules, e.g., maximum price change, margin, competitive pricing, size, brand, product line, and promotion; and the unconstrained best solution set based on a second set of business rules. Both the first and second set of business rules can include non-negotiable or hard business rules, e.g., minimum price change, locked process, ending numbers, and multiples. The constrained best solution is the recommend price set for a selected weight and the unconstrained best solution is the optimal price set for the selected weight.

Figure 3:
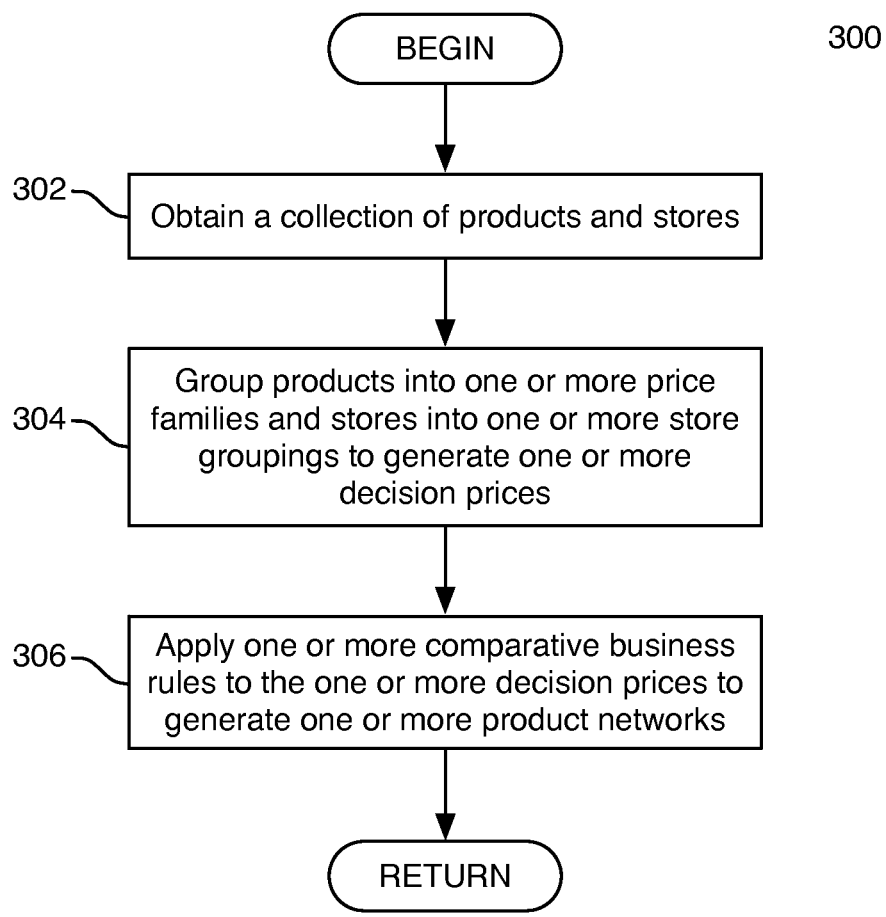
FIG. 3 illustrates an exemplary method embodiment for generating product networks.

The price optimization technique operates on a product network. FIG. 3 is a flowchart illustrating an exemplary method 300 for generating product networks. For the sake of clarity, this method is discussed in terms of an exemplary computing system, such as is shown in FIGS. 1A and 1B. Although specific steps are shown in FIG. 3, in other embodiments a method can have more or less steps.

Method 300 begins when the computing system obtains a collection of products and stores (302). Price family groupings of products and zone and vendor groupings of stores define decision prices. To generate decision prices the computing system can group the products into one or more price families and the stores into one or more store groupings (304). After identifying product families and store groupings, the computing system can applying one or more business rules that define a relationship between decision prices to the groupings to generate product networks (306). For example, products with prices related by comparative business rules, such as size, quantity, brand, product line, or promotion, can be grouped into the same product network. In some cases, the computing system can represent the decision prices as nodes in a graph, and then the business rule constraints can be edges connecting the nodes. Each connected sub-graph within the graph then represents a product network.

Figure 4:
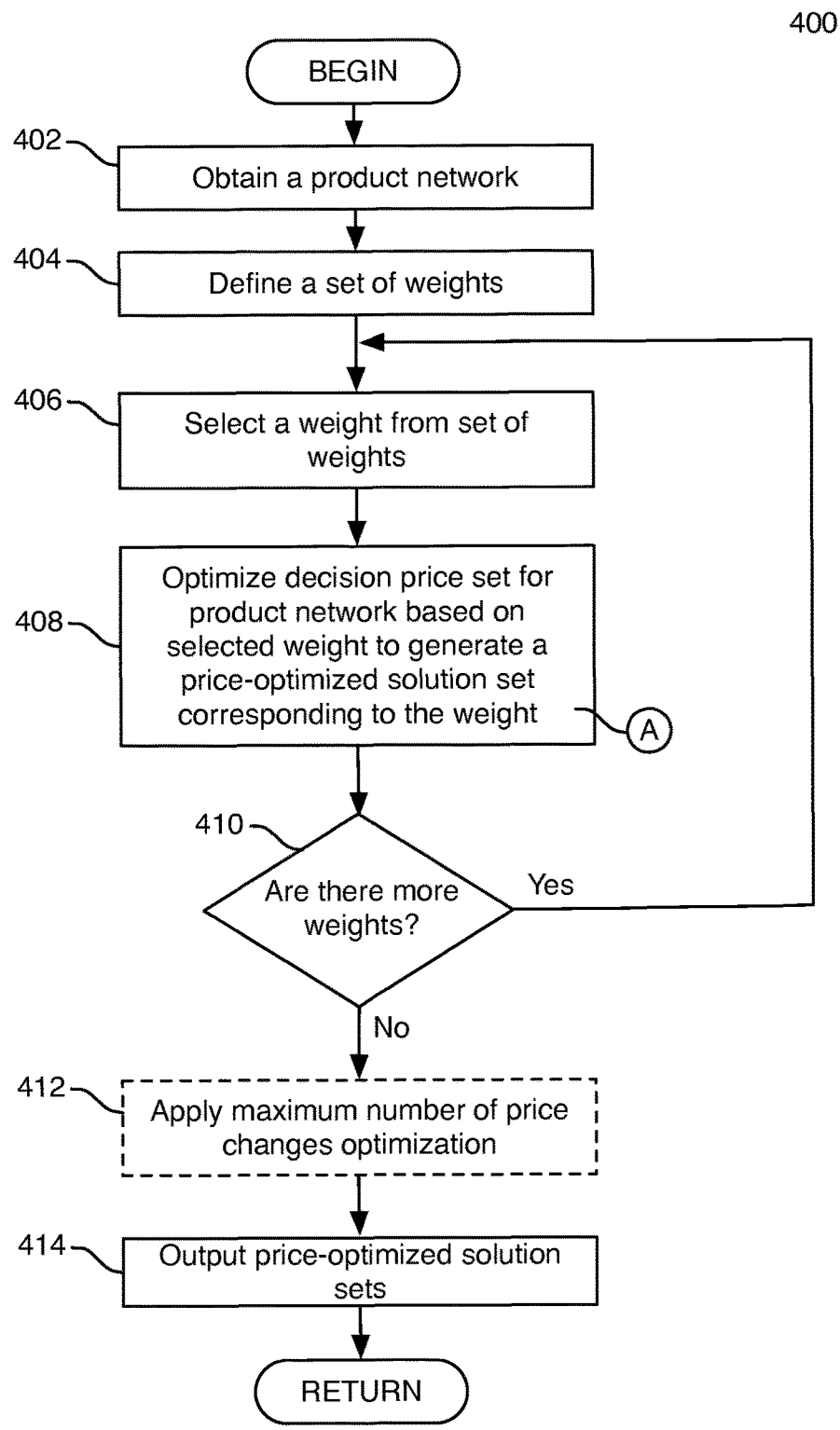
FIG. 4 illustrates an exemplary method embodiment for generating recommended price sets for a collection of weights, such as revenue-profit weights.

FIG. 4 is a flowchart illustrating a method 400 for generating recommended price sets for a product network across a set of revenue-profit weights. In particular, method 400 can be used to generate recommended price sets that optimize revenue and profit while complying with a set of business rules. For the sake of clarity, this method is discussed in terms of an exemplary computing system, such as is shown in FIGS. 1A and 1B. Although specific steps are shown in FIG. 4, in other embodiments a method can have more or less steps.

Method 400 begins when the computing system obtains a product network (402). The computing system can obtain the product network by generating the product network using a variety of techniques, including method 300 in FIG. 3. In some embodiments, one or more product networks can be pre-computed and stored. Alternatively, one or more product networks can be computed as part of method 400. When there is more than one product network, method 400 can be applied iteratively to each of the one or more product networks.

The computing system can also define a set of revenue-profit weights (404. For example, a revenue-profit weight scheme can be defined with a range of zero to one using 0.02 increments. In this case, the scheme would define a set of 51 revenue-profit weights. The revenue-profit weight scheme can also be dynamic, where a weight selection depends on the history of prior optimizations. For example, if weights 0.2 and 0.4 yield essentially the same revenue and profit and a weight of 0.6 is significantly different, then a subsequently selected weight can be 0.5 rather than 0.3.

The computing system can generate one or more price-optimized solution sets for each product network by first selecting a weight from the set of weights (406). Then the computing system can optimize the decision set for the product network based on the selected weight to generate a price-optimized solution set corresponding to the weight (408). The computing system can define one or more price-optimizations, such as a revenue-profit optimization including method 600 in FIG. 6, described below. The computing system can apply the one or more price-optimizations to generate a plurality of price-optimized solution sets for each product network by optimizing the decision price set for each product network. In some cases, the one or more price-optimizations can be applied independently such that a first price-optimization generates a first plurality of price-optimized solution sets and a second price-optimization generates a second plurality of price-optimized solution sets. The one- or more price-optimizations can also be applied in conjunction with each other. For example, a first price-optimization can generate a plurality of price-optimized solution sets. Then a second price-optimization can be applied to each of those price-optimized solution sets. Additionally, in some cases, a price-optimization can define a set of weights or optimization factors. These weights or factors can be used to generate multiple price-optimization solution sets from a single decision price set. One possible price-optimization is a revenue-profit optimization. The revenue-profit optimization can define a set of revenue-profit weights.

After generating the price-optimized solution set for a (product network, weight) pair, the computing system can check if there are more weights (410). In some cases, checking for more weights can include computing a new weight, such as when the weights are dynamic. If so, the computing system repeats the steps of selecting a weight (406), and generating a price-optimized solution set corresponding to the selected weight for the product network (408).

Figure 5:
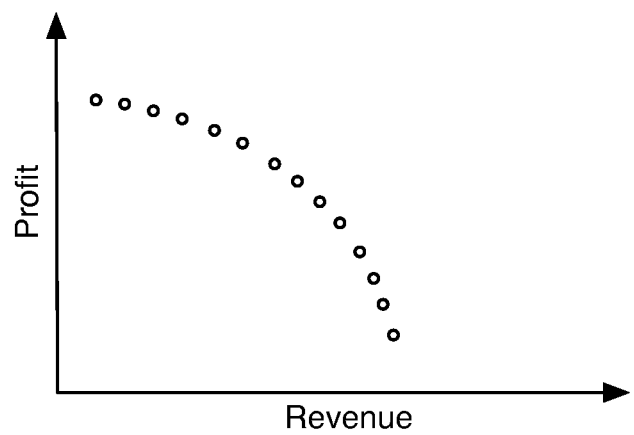
FIG. 5 illustrates an exemplary revenue-profit frontier curve.

If all of the weights have been processed, the computing system can optionally apply a maximum number price changes optimization (412) prior to outputting the price-optimized solution sets (414). The output can occur in one or more forms, including saving, rendering, and/or printing the information. The computing system can save a file comprising the information. The file can be saved in memory associated with the computing system, such as in a database communicatively coupled to a processor in the computing system. The computing system can render the information on a display communicatively to the computing system. The computer system can transmit the information to a printer communicatively coupled to the computing system. In some embodiments, the output can be a frontier curve in revenue and profit. For example, FIG. 5 illustrates a revenue-profit frontier curve for a sequence of revenue-profit weights. A retailer can use a frontier curve to select a solution that meets a global margin level.

Figure 6:
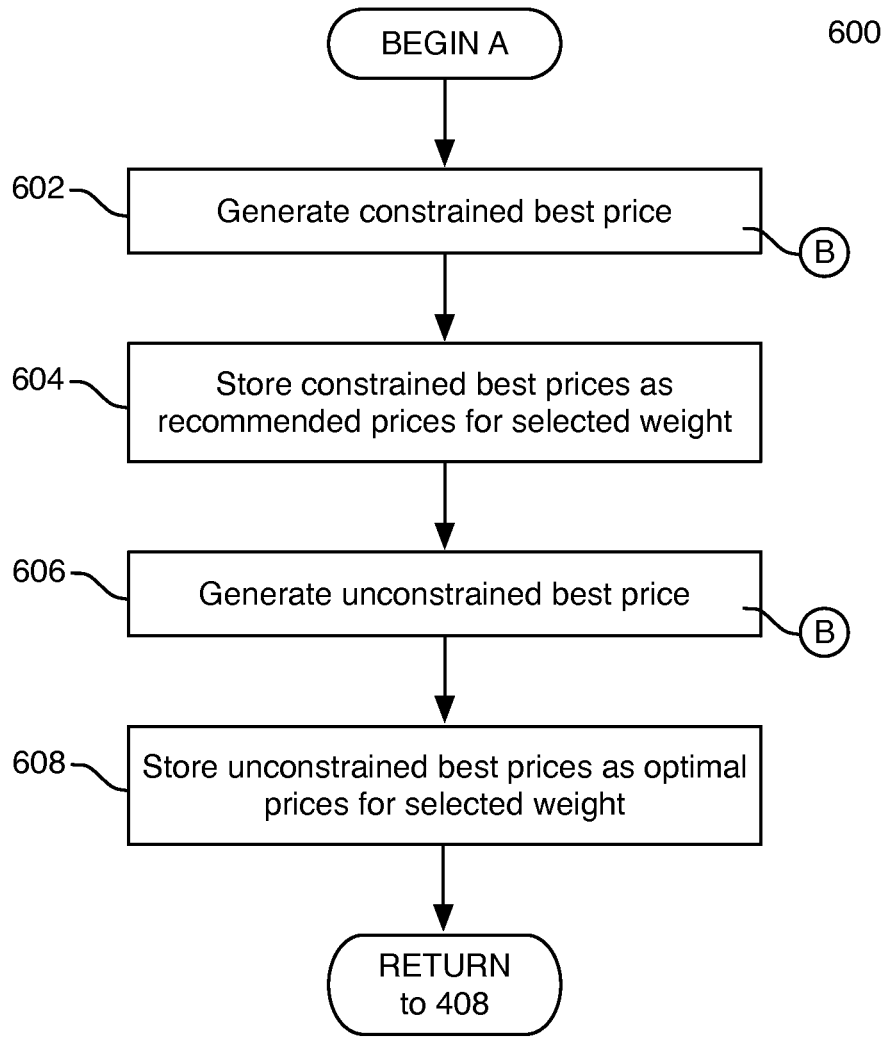
FIG. 6 illustrates an exemplary method embodiment for generating one or more price-optimized solution sets for a product network corresponding to a selected revenue-profit weight.

FIG. 6 is a flowchart illustrating an exemplary method 600 for generating one or more price-optimized solution sets for a product network corresponding to a selected revenue-profit weight. In particular, method 600 can be used to generate price-optimized recommended prices that optimize revenue and profit while adhering to one or more business rules. For the sake of clarity, this method is discussed in terms of an exemplary computing system, such as is shown in FIGS. 1A and 1B. Although specific steps are shown in FIG. 6, in other embodiments a method can have more or less steps.

The price-optimization method 600 can begin when the computing system generates a constrained best solution set for the selected (product network, revenue-profit weight) pair (602). Each value in a price optimized solution set has a monetary value. The monetary value can be defined for a revenue-profit weight W. For example, for a revenue-profit weight, monetary value can be defined as Value=$((1-W) \times$ Revenue$)+(W \times$Profit$))$. When the computing system generates a constrained best solution set, the computing system adjusts the monetary value to trade off revenue and profit against one or more business rule constraints, including flexible or optional business rules, e.g., maximum price change, margin, competitive pricing, size, brand, product line, and promotion; and hard or non-negotiable business rules, e.g., minimum price change, locked process, ending numbers, and multiples. The constrained best solution set can be generated using a variety of techniques, including hill climb method 700 in FIG. 7, described below. After generating the constrained best solution set, the computing system can store the solution set as the recommended prices for the selected weight (604).

The computing system can also generate an unconstrained best solution set for the selected revenue-profit weight (606). When the computing system generates an unconstrained best solution set, the computing system adjusts the monetary value to trade off revenue and profit against one or more hard or non-negotiable business rules, e.g. minimum price change, locked process, ending numbers, and multiples. As with the constrained best solution set, the unconstrained best solution set can be generated using a variety of techniques, including hill climb method 700 in FIG. 7, described below. After generating the unconstrained best solution set, the computing system can store the solution set as the optimal prices for the selected weight (608). After storing both the constrained and unconstrained best solution sets, the computing system can resume previous processing, which can include resuming processing at step 408 of method 400 in FIG. 4.

Figure 7:
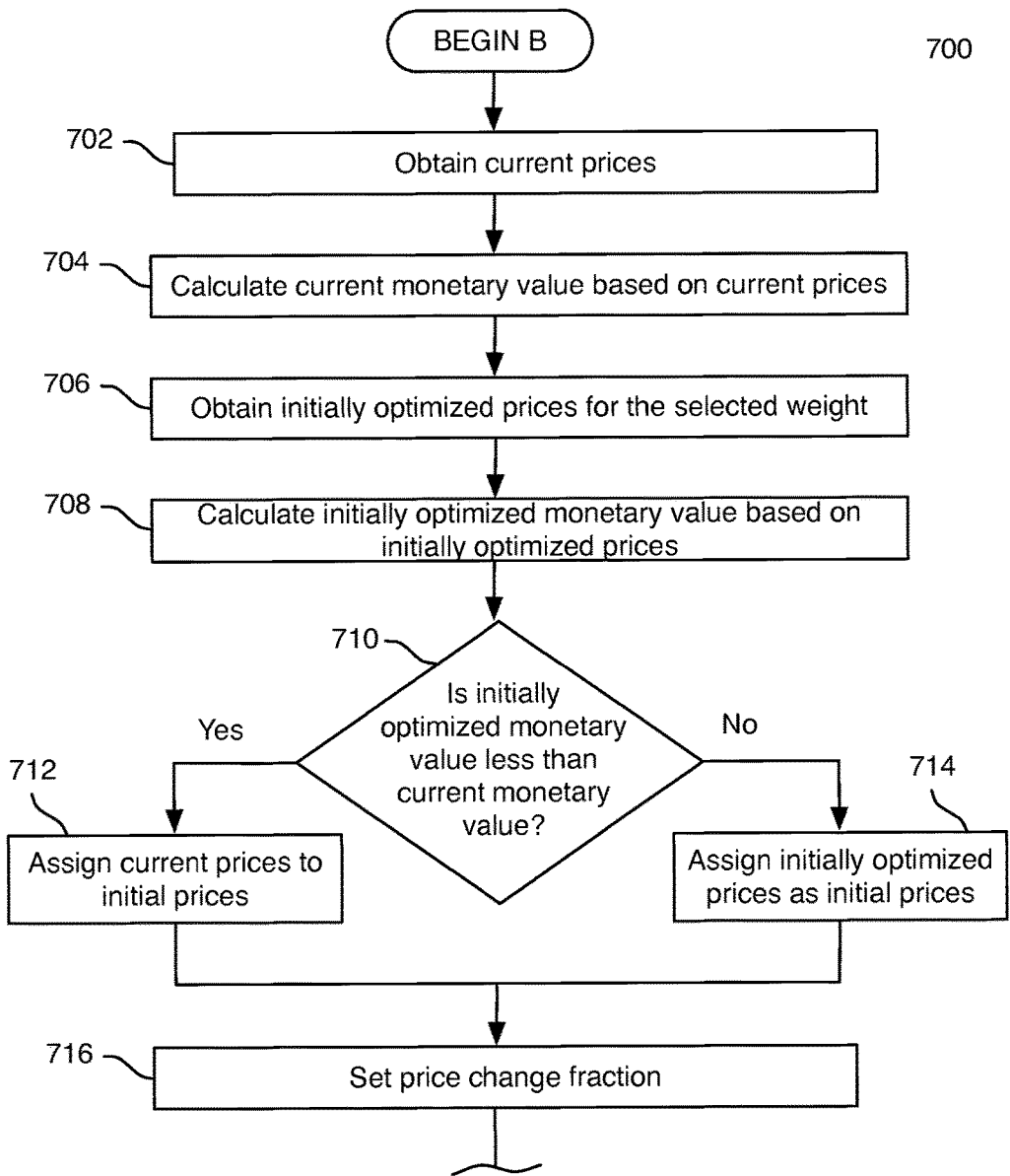
FIG. 7 illustrates an exemplary method embodiment for generating either a constrained or unconstrained best solution set.
Figure 7:
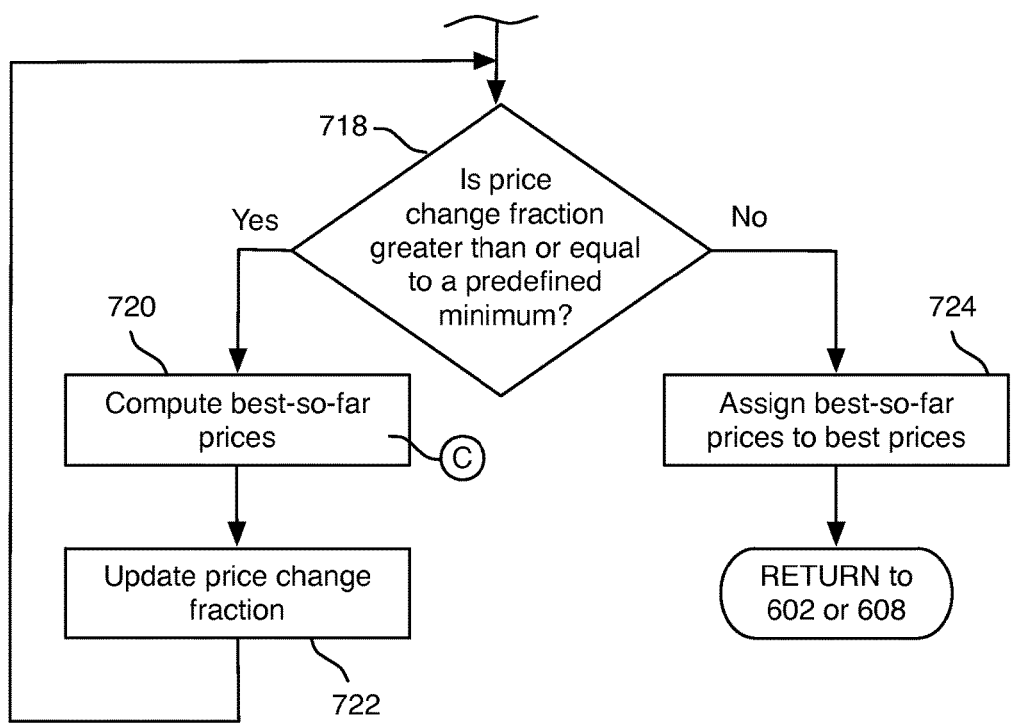

FIG. 7 is a flowchart illustrating an exemplary hill climb method 700 for generating either a constrained or unconstrained best solution set. For the sake of clarity, this method is discussed in terms of an exemplary computing system, such as is shown in FIGS. 1A and 1B. Although specific steps are shown in FIG. 7, in other embodiments a method can have more or less steps.

The hill climb method 700 can begin when the computing system obtains current prices (702) and calculates a current monetary value based on the current prices (704). The computing system also obtains initially optimized prices for the selected revenue-profit weight (706) and calculates an initially optimized monetary value based on the initially optimized prices (708). The computing system calculates both a current monetary value and an initially optimized monetary value to identify which is better in step 710, below. It is possible that a price-change, margin, or other rule enforced in the optimization can lead to a lower revenue-profit value even in the presence of optimizations. When this occurs the current monetary value can be better than the optimized monetary value.

Once the computing system has both the current monetary value and the initially optimized monetary value, the computing system can check if the initially optimized monetary value is less than the current monetary value (710). If so, the computing system can set the current prices as the initial decision prices for the product network (712). Otherwise, the computing system can set the initially optimized prices as the initial decision prices for the product network (714). The computing system can also initialize the best-so-far prices using the initial decision prices.

After setting the initial decision prices for the product network, the computing system can set an initial value for a price change fraction (716), which the computing system can use to adjust a decision price. A possible initial value can be 0.1. The computing system can then check if the price change fraction is greater than a predefined minimum value (718), such as 0.01.

If the price change fraction is still greater than a predefined minimum value, then the computing system can compute best-so-far prices (720). The best-so-far prices can be generated using a variety of techniques, including method 800 in FIG. 8, described below.

After computing the best-so-far prices, the computing system can update the price change fraction (722). A technique for updating the price change fraction can be to multiply the current price change fraction by a predefined value. For example, price change fraction=price change fraction×0.7.

After updating the price change fraction, the computing system can again check if the price change fraction is greater than a predefined minimum value (718). If not, the computing system can set best prices as computed best-so-far prices (724). The computing system can then resume previous processing, which can include resuming processing at steps 602 or 606 of method 600 in FIG. 6.

Figure 8:
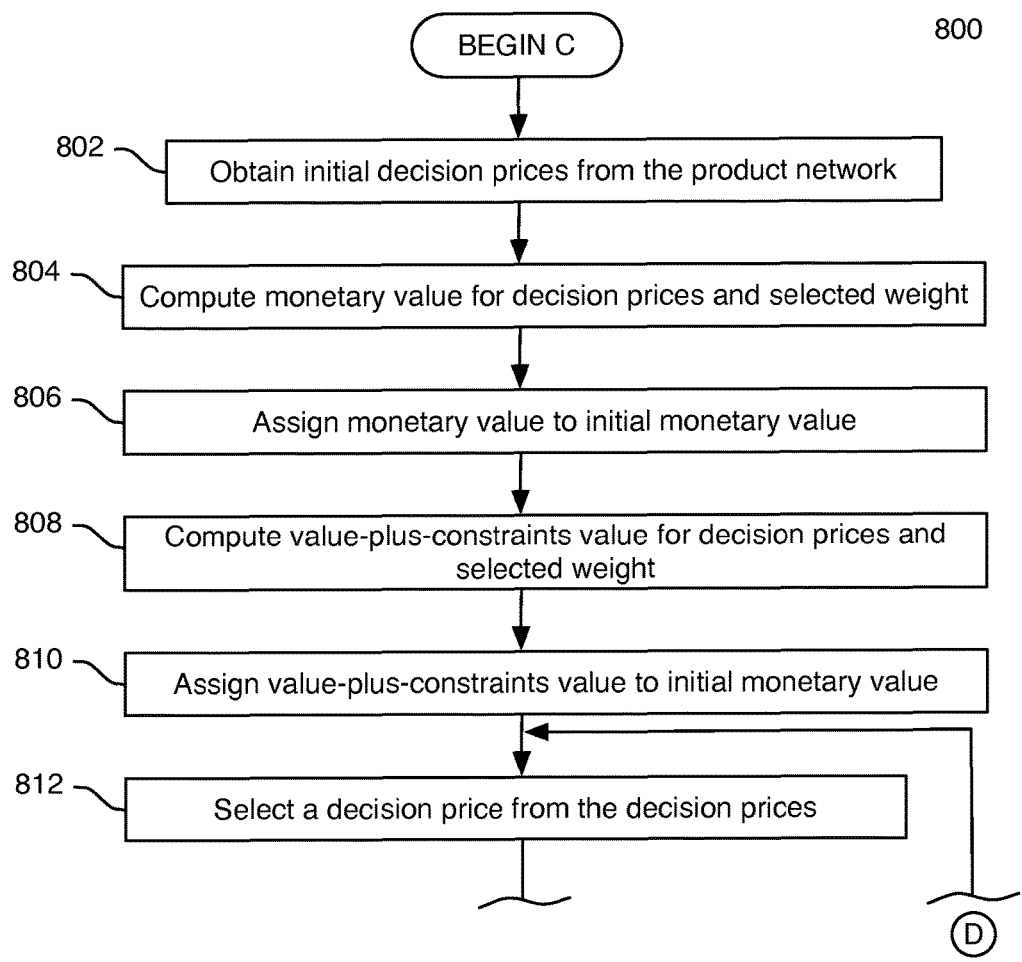
FIG. 8 illustrates an exemplary method embodiment for generating best-so-far prices.
Figure 8:
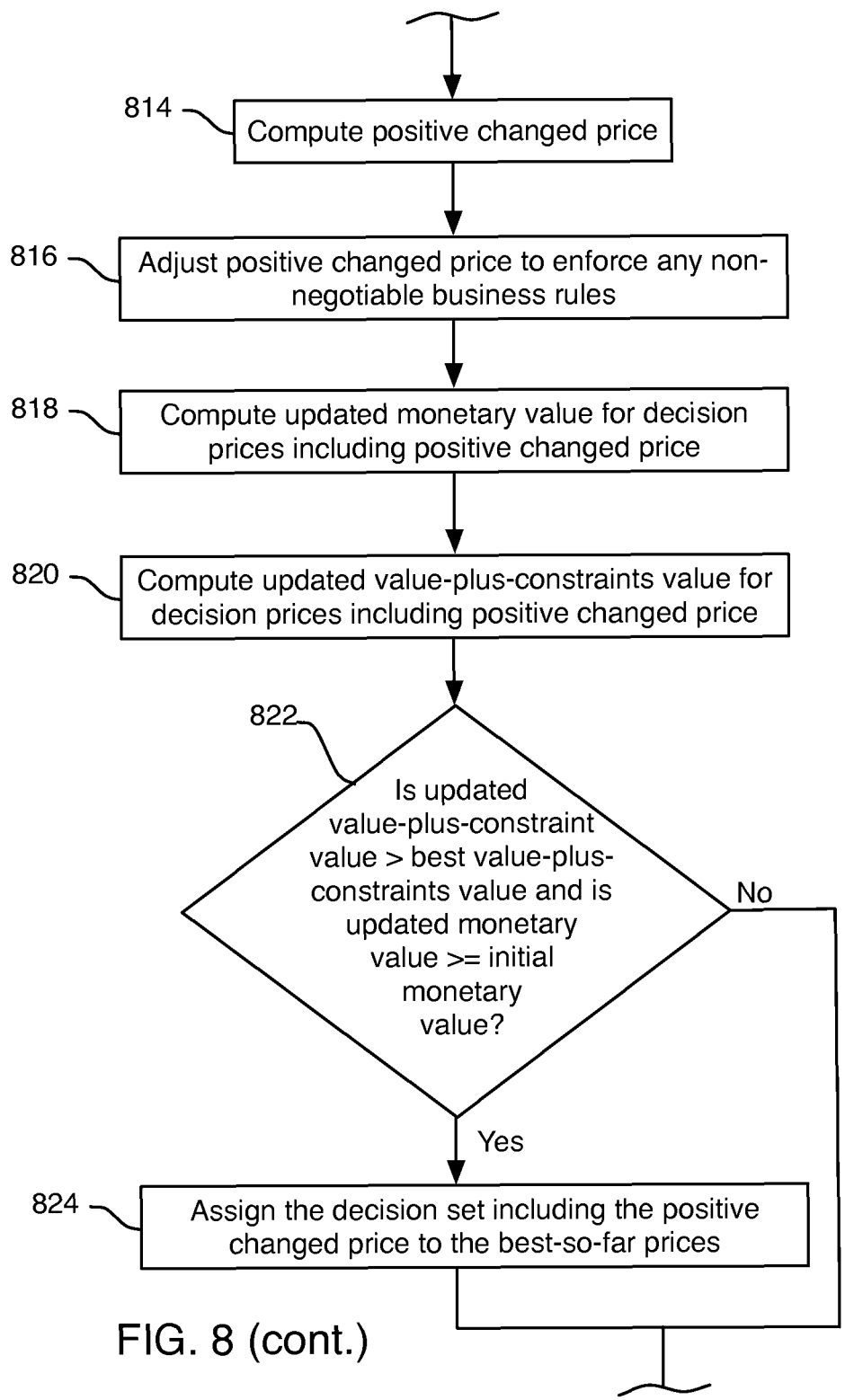
Figure 8:
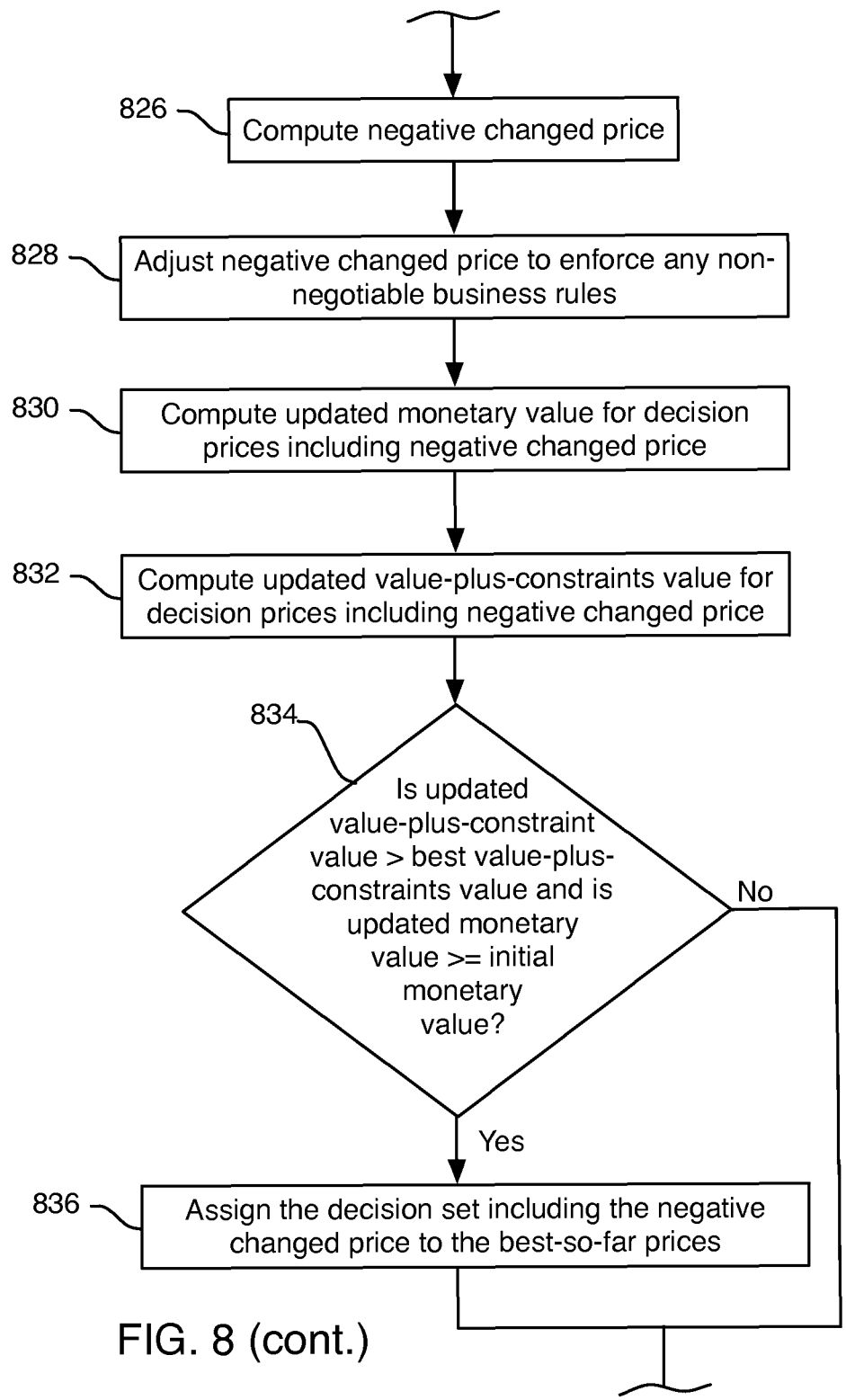
Figure 8:
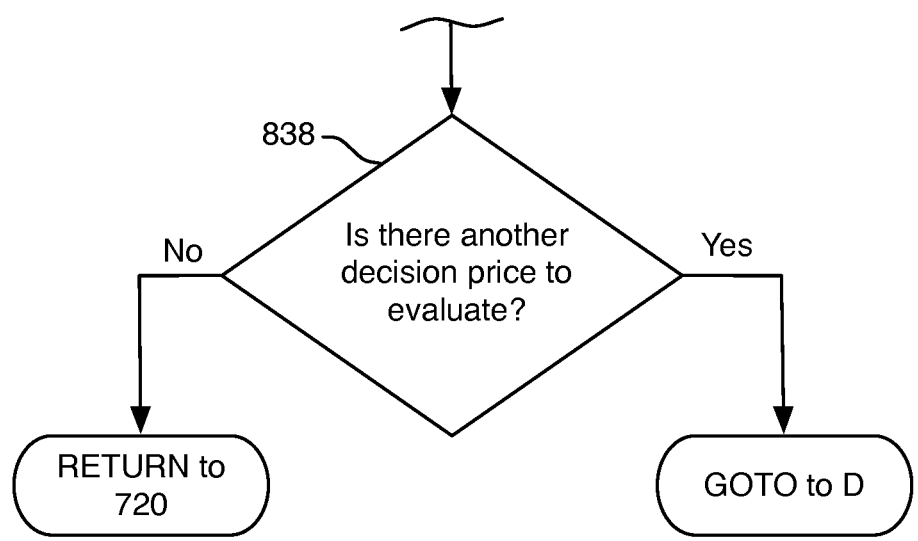

FIG. 8 is a flowchart illustrating an exemplary method 800 for generating best-so-far prices. For the sake of clarity, this method is discussed in terms of an exemplary computing system, such as is shown in FIGS. 1A and 1B. Although specific steps are shown in FIG. 8, in other embodiments a method can have more or less steps.

The best-so-far prices method can begin when the computing system obtains initial decision prices for the product network (802). Using the initial decision prices, the computing system can compute a monetary value for the (product network, selected weight) pair (804) and assign the computed monetary value as an initial monetary value (806). The monetary value can be a revenue-profit value, such as Value=((1−W)×Revenue)+(W×Profit)).

Using the initial decision prices again, the computing system can compute a value-plus-constraints value for the (product network, selected weight) pair (808) and assign the computed value-plus-constraints value as a best value-plus-constraints value (810). The value-plus-constraints value is designed to assign a monetary value to the combination of revenue, profit, and rule compliance by answering the question: How many dollars of revenue-profit value is a violation of a flexible business rule worth? In particular, the value-plus-constraints value is computed for a set of decision prices by starting with the optimal revenue-profit monetary value for the decision set. That is, the maximum revenue-profit value without regard for any business rules. Then for each decision price that violates a business rule constraint, a penalty value is added to the value.

In general, a penalty value can be computed based on a penalty function, such as $p(\epsilon/P^{opt})$, where a constraint violation $\epsilon$ is scaled down by the optimal price $P^{opt}$. The result of the penalty function is then scaled by the optimal revenue-profit value yielding a constraint penalty value of $V^{opt} \times p(\epsilon/P^{opt})$. This scaling heuristic uses the optimal price $P^{opt}$ and revenue-profit value $V^{opt}$ to access a monetary value of a constraint violation scaled to revenue and profit. It allows the penalty function p(x) to be independent of price and value across a collection of varying products and stores. If the violated constraint has only one decision price, e.g., minimum price change, maximum price change, margin, locked prices, ending numbers, etc., the violation amount is directly applied. However, if the violated constraint involves two decision prices, e.g., size, branch, product line, promotion, etc., then half of the violation amount is applied to each of the two decision prices to achieve a "meet in the middle" approach. For example, suppose product A is $1.20 and product B is $2.00 and that the business rule states that product B should be twice the price of product A. Then product A has a constraint violation of $0.20 and product B has a constraint violation of $0.40. By applying half the violation amount to each we end up applying $0.10 to product A and $0.20 to product B.

After computing the initial monetary value and value-plus-constraints value, the computing system can select a decision price from the decision prices (812). From the selected decision price, the computing system can compute both a positive changed price (814) and a negative changed price (826). Staring with the positive changed price, the computing system can positively adjust the selected decision price by the current price change fraction. For example, the computing system can add the current price change fraction to the decision price, i.e. positive changed price=decision price+price change fraction. The computing system can then adjust the positive changed price to enforce any non-negotiable rules (816), such as minimum price change, locked prices, ending numbers, and multiples. Using the decision prices including the positive changed price, the computing system can compute an updated monetary value (818) and an updated value-plus-constraints value (820).

After computing the updated monetary value and updated value-plus-constraints value, the computing system can compare them with the initial monetary value and the best value-plus-constraints value. The computing system checks if the updated value-plus-constraints value is greater than the best value-plus-constraints value and the updated monetary value is greater than or equal to the initial monetary value (822). If so, the computing system assigns the decision set including the positive changed price to the best-so-far prices (824).

For the negative changed price, the computing system can negatively adjust the selected decision price by the current price change fraction. For example, the computing system can subtract the current price change fraction from the decision price, i.e. negative changed price=decision price−price change fraction. The computing system can then adjust the negative changed price to enforce any non-negotiable rules (828), such as minimum price change, locked prices, ending numbers, and multiples. Using the decision prices including the negative changed price, the computing system can compute an updated monetary value (830) and an updated value-plus-constraints value (832).

After computing the updated monetary value and updated value-plus-constraints value, the computing system can compare them with the initial monetary value and the best value-plus-constraints value. The computing system checks if the updated value-plus-constraints value is greater than the best value-plus-constraints value and the updated monetary value is greater than or equal to the initial monetary value (834). If so, the computing system assigns the decision set including the positive changed price to the best-so-far prices (836).

After evaluating both positive and negative changed price options, the computing system checks if there is another decision price in the decision prices to evaluate (838). If so, the computing system selects a next decision price (812). Once all decision prices have been evaluated, the computing system has determined the best-so-far prices for the selected weight. The computing system can then resume previous processing, which can include resuming processing at step 720 of method 700 in FIG. 7.

It should be noted that in the case where the computing system is performing best-so-far prices method 800 with no flexible or optional business rules, the monetary value and the value-plus-constraints value for the (product network, selected weight) pair would be the same. This can occur when the computing system arrives at method 800 as a result of calculating unconstrained prices at step 606 of method 600 in FIG. 6.

The present technology can take the form of hardware, software or both hardware and software elements. In some implementations, the technology can be implemented in software, which includes but is not limited to firmware, resident software, microcode, a Field Programmable Gate Array (FPGA), graphics processing unit (GPU), or Application-Specific Integrated Circuit (ASIC). In particular, for real-time or near real-time use, an FPGA or GPU implementation would be desirable.

Furthermore, portions of the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be non-transitory (e.g., an electronic, magnetic, optical, electromagnetic, infrared, or semiconductor system (or apparatus or device)) or transitory (e.g., a propagation medium). Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Both processors and program code for implementing each as aspect of the technology can be centralized or distributed (or a combination thereof) as known to those skilled in the art.

The various embodiments described above are provided by way of illustration only and should not be construed to limit the scope of the disclosure. Examples within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection can be properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply not only to a smartphone device but to other devices capable of receiving communications such as a laptop computer. Those skilled in the art will readily recognize various modifications and changes that may be made to the principles described herein without following the example embodiments and applications illustrated and described herein, and without departing from the scope of the disclosure.

What is claimed is:

1. A computer-implemented method comprising:
obtaining a product network having a decision price set, each price family of the one or more price families having one or more products sharing a similar response to changes in price to the one or more products; and
generating, via processor, a plurality of price-optimized solution sets for the product network by optimizing the decision price set based on a plurality of revenue-profit weights as follows:
repeatedly selecting a revenue-profit weight for a number of revenue-profit weights, and for each weight:
generating a constrained best solution set by adjusting a monetary value based on a first set of business rules, wherein the first set of business rules include at least one flexible business rule and when the monetary value based on the first set of business rules violates the at least one flexible business rule a penalty value is added to the monetary value based on the first set of business rules, and storing the constrained best solution set as a recommended price set for the selected weight, and
generating an unconstrained best solution set by adjusting a monetary value based on a second set of business rules, and storing the unconstrained best solution set as an optimal price set for the selected weight,
wherein generating a best solution set comprises:
calculating a current monetary value based on an obtained current price set,
calculating an initially optimized monetary value based on an obtained initially optimized price set,
comparing the current monetary value to the initially optimized monetary value to select an initial decision price set, wherein the initial decision price set is the current price set when the initially optimized monetary value is less than the current monetary value and the initially optimized price set otherwise, and
repeatedly updating a price change fraction while the price change fraction is greater than a predefined minimum value, and for each price change fraction computing a best-so-far price set, and
wherein computing the best-so-far price set comprises:
computing an initial monetary value for the initial decision set,
computing a value-plus-constraints value for the initial decision price set based on a set of business rules,
repeatedly selecting a decision price from the decision price set, and for each decision price:
computing a positive changed price based on the decision price and the price change fraction, wherein the positive changed price conforms to any non-negotiable business rules,
computing an updated monetary value and an updated value-plus-constraints value based on the decision price set including the positive changed price,
in the event that the updated value-plus-constraints value is greater than a best value-plus-constraints value and the updated monetary value is at least as great as the initial monetary value, assigning the decision price set including the positive changed price as the best-so-far price set,
computing a negative changed price based on the decision price and the price change fraction, wherein the negative changed price conforms to any non-negotiable business rules,
computing an updated monetary value and an updated value-plus-constraints value based on the decision price set including the negative changed price, and
in the event that the updated value-plus-constraints value is greater than a best value-plus-constraints value and the updated monetary value is at least as great as the initial monetary value, assigning the decision price set including the negative changed price as the best-so-far price set.

2. The computer-implemented method of claim 1, wherein computing a value-plus-constraints value for a decision price set comprises:
computing a monetary value for the decision set; and
adding a constraint penalty value to the monetary value when a decision price in the decision price set violates a business rule.

3. The computer-implemented method of claim 2, wherein the constraint penalty value is $p(\epsilon/P^{opt})$ computed based on a penalty function scaled by $V^{opt}$ wherein $\epsilon$ is a constraint violation, $P^{opt}$ is an optimal price, and $V^{opt}$ is an optimal revenue-profit value.

4. The computer-implemented method of claim 2, wherein for a violated business rule with multiple decision prices, the constraint penalty value is split equally and applied to each of the multiple decision prices.

5. The computer-implemented method of claim 1, wherein a flexible business rule is at least one of maximum price change, margin, competitive pricing, size, brand, product line, or promotion, and a non-negotiable business rule is at least one of minimum price change, locked prices, ending numbers, or multiples.

6. A manufacture comprising:
a non-transitory computer-readable storage medium; and
a computer-executable instruction stored on the non-transitory computer-readable storage medium which, when executed by a computing device, causes the computing device to perform a method comprising:
generating a plurality of price-optimized solution sets for a product network, each price family of the one or more price families having one or more products sharing a similar response to changes in price to the one or more products having a decision price set by optimizing the decision price set based on a plurality of revenue-profit weights as follows:
repeatedly selecting a revenue-profit weight for a number of revenue-profit weights, and for each weight:
generating a constrained best solution set by adjusting a revenue-profit value based on a first set of business rules, wherein the first set of business rules include at least one flexible business rule, and storing the constrained best solution set as a recommended price set for the selected weight, and
generating an unconstrained best solution set by adjusting a revenue-profit value based on a second set of business rules, and storing the constrained best solution set as an optimal price set for the selected weight, and wherein generating a best solution set comprises:
calculating a current revenue-profit value based on an obtained current price set,
calculating an initially optimized revenue-profit value based on an obtained initially optimized price set,
comparing the current revenue-profit value to the initially optimized revenue-profit value to select an initial decision price set, wherein the initial decision price set is the current price set when the initially optimized revenue-profit value is less than the current revenue-profit value and the initially optimized price set otherwise, and
repeatedly updating a price change fraction while the price change fraction is greater than a predefined minimum value, and for each price change fraction: computing a best-so-far price set, and
wherein computing the best-so-far price set comprises:
computing an initial revenue-profit value for the initial decision set,
computing a value-plus-constraints value for the initial decision price set based on a set of business rules,
repeatedly selecting a decision price from the decision price set, and for each decision price:
computing a positive changed price based on the decision price and the price change fraction, wherein the positive changed price conforms to any non-negotiable business rules,
computing an updated revenue-profit value and an updated value-plus-constraints value based on the decision price set including the positive changed price,
in the event that the updated value-plus-constraints value is greater than a best value-plus-constraints value and the updated revenue-profit value is at least as great as the initial revenue-profit value, assigning the decision price set including the positive changed price as the best-so-far price set,
computing a negative changed price based on the decision price and the price change fraction, wherein the negative changed price conforms to any non-negotiable business rules,
computing an updated revenue-profit value and an updated value-plus-constraints value based on the decision price set including the negative changed price, and
in the event that the updated value-plus-constraints value is greater than a best value-plus-constraints value and the updated revenue-profit value is at least as great as the initial revenue-profit value, assigning the decision price set including the negative changed price as the best-so-far price set.

7. The manufacture of claim 6, wherein computing a value-plus-constraints value for a decision price set comprises: computing a revenue-profit value for the decision set; and
adding a constraint penalty value to the revenue-profit value when a decision price in the decision price set violates a business rule, wherein the constraint penalty value is $V^{opt} \times p(\epsilon/P^{opt})$, wherein $\epsilon$ is a constraint violation, $P^{opt}$ is an optimal price, and $V^{opt}$ is an optimal revenue-profit value.

8. A system comprising:
a processor; and
a computer-readable storage medium storing instructions for controlling the processor to perform steps comprising:
obtaining a product network having a decision price set, each price family of the one or more price families having one or more products sharing a similar response to changes in price to the one or more products;
generating a plurality of price-optimized solution sets for a product network having a decision price set by optimizing the decision price set based on a plurality of revenue-profit weights as follows:
repeatedly selecting a revenue-profit weight for a number of revenue-profit weights, and for each weight:
generating a constrained best solution set by adjusting a revenue-profit value based on a first set of business rules, wherein the first set of business rules include at least one flexible business rule and when the revenue profit value based on the first set of business rules violates the at least one flexible business rule a penalty value is added to the revenue-profit value based on the first set of business rules, and storing the constrained best solution set as a recommended price set for the selected weight, and
generating an unconstrained best solution set by adjusting a revenue-profit value based on a second set of business rules, and storing the constrained best solution set as an optimal price set for the selected weight; and
outputting information associated with the plurality of price-optimized solution sets, and
wherein generating a best solution set comprises:
calculating a current revenue-profit value based on an obtained current price set;
calculating an initially optimized revenue-profit value based on an obtained initially optimized price set;
comparing the current revenue-profit value to the initially optimized revenue-profit value to select an initial decision price set, wherein the initial decision price set is the current price set when the initially optimized revenue-profit value is less than the current revenue-profit value and the initially optimized price set otherwise; and
repeatedly updating a price change fraction while the price change fraction is greater than a predefined minimum value, and for each price change fraction: computing a best-so-far price set, and
wherein computing the best-so-far price set comprises:
computing an initial revenue-profit value for the initial decision set;
computing a value-plus-constraints value for the initial decision price set based on a set of business rules; repeatedly selecting a decision price from the decision price set, and for each decision price:

computing a positive changed price based on the decision price and the price change fraction, wherein the positive changed price conforms to any non-negotiable business rules, computing an updated revenue-profit value and an updated value-plus-constraints value based on the decision price set including the positive changed price, in the event that the updated value-plus-constraints value is greater than a best value-plus-constraints value and the updated revenue-profit value is at least as great as the initial revenue-profit value, assigning the decision price set including the positive changed price as the best-so-far price set, computing a negative changed price based on the decision price and the price change fraction, wherein the negative changed price conforms to any non-negotiable business rules, computing an updated revenue-profit value and an updated value-plus-constraints value based on the decision price set including the negative changed price, and in the event that the updated value-plus-constraints value is greater than a best value-plus-constraints value and the updated revenue-profit value is at least as great as the initial revenue-profit value, assigning the decision price set including the negative changed price as the best-so-far price set.

9. The system of claim 8, wherein computing a value-plus-constraints value for a decision price set comprises:
computing a revenue-profit value for the decision set; and
adding a constraint penalty value to the revenue-profit value when a decision price in the decision price set violates a business rule, wherein the constraint penalty value is $V^{opt} \times p(\epsilon/P^{opt})$, wherein $\epsilon$ is a constraint violation, $P^{opt}$ is an optimal price, and $V^{opt}$ is an optimal revenue-profit value.

10. The system of claim 8, wherein obtaining a product network having a decision price set comprises:
obtaining a collection of products and stores;
generating one or more decision prices by grouping the products into one or more price families, and grouping the stores into one or more store groupings; applying one or more business rules to the one or more decision prices to generate one or more product networks; and
selecting a product network form the one or more product networks.

11. The system of claim 10, wherein the one or more business rules are one or more comparative business rules selected from a group consisting of: size, quantity, brand, product line, and promotion.

12. The system of claim 10, wherein applying one or more business rules to the one or more decision prices to generate one or more product networks comprises: for each of the one or more decision prices, representing the decision price as a node in a graph; for each of the one or more business rules adding an edge to the graph; and identifying one or more connected sub-graphs in the graph, a connected sub-graph defining a product network.

13. The system of claim 8, wherein the number of revenue-profit weights is determined dynamically based on at least one previously generated price-optimized solution set.

14. The system of claim 8, the steps further comprising:
prior to outputting information associated with the plurality of price-optimized solution sets, applying a maximum number of price changes optimization to the plurality of price-optimized solution sets.

15. A system comprising:
a processor; and
a computer-readable storage medium storing instructions for controlling the processor to perform steps comprising:
obtaining a product network having a decision price set, the product network having one or more price families that are linked together by one or more business rules, each price family of the one or more price families having one or more products sharing a similar response to changes in price to the one or more products, wherein obtaining the product network having the decision price set comprises obtaining a collection of products and stores and generating one or more decision prices by grouping the products into one or more price families, and grouping the stores into one or more store groupings, applying one or more business rules to the one or more decision prices to generate one or more product networks, and selecting a product network form the one or more product networks;
generating a plurality of price-optimized solution sets for a product network having a decision price set by optimizing the decision price set based on a plurality of revenue-profit weights as follows:
repeatedly selecting a revenue-profit weight for a number of revenue-profit weights, and for each weight:
generating a constrained best solution set by adjusting a revenue-profit value based on a first set of business rules, wherein the first set of business rules include at least one flexible business rule, and storing the constrained best solution set as a recommended price set for the selected weight, and
generating an unconstrained best solution set by adjusting a revenue-profit value based on a second set of business rules, and storing the constrained best solution set as an optimal price set for the selected weight; and
outputting information associated with the plurality of price-optimized solution sets, and
wherein applying one or more business rules to the one or more decision prices to generate one or more product networks comprises:
for each of the one or more decision prices representing the decision price as a node in a graph and for each of the one or more business rules adding an edge to the graph; and
identifying one or more connected sub-graphs in the graph, a connected sub-graph defining a product network.

* * * * *